(12) United States Patent
Liu et al.

(10) Patent No.: US 12,487,431 B2
(45) Date of Patent: Dec. 2, 2025

(54) LENS MODULE AND ELECTRIC DEVICE

(71) Applicant: Henan Hozel Electron Inc., Henan (CN)

(72) Inventors: Shulun Liu, Guangdong (CN); Xinlong Geng, Guangdong (CN); Chao Luo, Guangdong (CN)

(73) Assignee: Henan Hozel Electron Inc., Henan (CN)

( * ) Notice: Subject to any disclaimer, the term of this patent is extended or adjusted under 35 U.S.C. 154(b) by 54 days.

(21) Appl. No.: 17/798,073

(22) PCT Filed: Jan. 14, 2022

(86) PCT No.: PCT/CN2022/072009
§ 371 (c)(1),
(2) Date: Sep. 15, 2022

(87) PCT Pub. No.: WO2022/188546
PCT Pub. Date: Sep. 15, 2022

(65) Prior Publication Data
US 2024/0201469 A1 Jun. 20, 2024

(30) Foreign Application Priority Data
Mar. 12, 2021 (CN) .......................... 202120529912.3

(51) Int. Cl.
*G02B 7/08* (2021.01)
*G02B 27/64* (2006.01)
(52) U.S. Cl.
CPC ............. *G02B 7/08* (2013.01); *G02B 27/646* (2013.01)
(58) Field of Classification Search
CPC .......... G02B 7/08; G02B 27/646; G02B 7/04; G02B 27/64; G03B 5/00; G03B 13/34; G03B 30/00; H04N 23/60
See application file for complete search history.

(56) References Cited

U.S. PATENT DOCUMENTS

2006/0266031 A1* 11/2006 Kosaka .................. G02B 7/102
60/527
2008/0256946 A1* 10/2008 Wakahara ................. F03G 7/06
29/857
(Continued)

FOREIGN PATENT DOCUMENTS

CN 101893748 A 11/2010
CN 208766375 U 4/2019
(Continued)

OTHER PUBLICATIONS

Examiner provided machine translation of (Cao et al.), (CN111158105) (Year: 2020).*
(Continued)

*Primary Examiner* — Bumsuk Won
*Assistant Examiner* — John Curtis Sipes
(74) *Attorney, Agent, or Firm* — NKL Law; Allen Xue (57) ABSTRACT

A lens module and an electronic device are provided. The lens module includes: a bearing portion; and at least two groups of SMA actuating structures, and each group is connected to the same side portion or different side portions of the bearing portion, and includes: a driven member fixedly provided at a side portion of the bearing portion; a first contact plate, two ends of a first SMA wire are each electrically connected to the first contact plate, and a middle portion of the first SMA wire is in contact with the driven member; and a second contact plate, two ends of a second SMA wire are each electrically connected to the second contact plate, and a middle portion of the second SMA wire is in contact with the driven member; the driven member is movably mounted between angles formed by the first SMA wire and the second SMA wire being bent.

14 Claims, 5 Drawing Sheets

(56) References Cited

U.S. PATENT DOCUMENTS

2012/0019675 A1     1/2012  Brown
2013/0279030 A1*   10/2013  Calvet .................... G02B 7/09
                                                          359/823
2023/0022701 A1*    1/2023  Li ........................ H04M 1/0264

FOREIGN PATENT DOCUMENTS

CN        110032024 A      7/2019
CN        111158105 A      5/2020
CN        214540194 U     10/2021

OTHER PUBLICATIONS

International Search Report for PCT/CN2022/072009 mailed Mar. 8, 2022, ISA/CN.

* cited by examiner

LENS MODULE AND ELECTRIC DEVICE

The present application is a National Phase entry of PCT Application No. PCT/CN2022/072009, filed on Jan. 14, 2022, which claims priority to Chinese Patent Application No.202120529912.3, titled "LENS MODULE AND ELECTRIC DEVICE", filed on Mar. 12, 2021 with the Chinese Patent Office, which are incorporated herein by reference in their entireties.

FIELD

The present application relates to the technical field of photography, and in particular to a lens module and an electric device.

BACKGROUND

SMA (shape memory alloy) is a material which is made of two or more metal materials and has a shape memory effect (SME) due to thermoelasticity and transformation and reverse transformation of martensitic. The SMA may be deformed at a relatively low temperature, and return to a shape before the deformation after being heated by electricity. An electrically controllable contraction is thus achieved.

The SMA has a large tensile force when it contracts, and thus it is suitable for serving as a driving device for a focusing or anti-shake function in a lens module. However, the SMA has certain disadvantages, for example, the SMA has a relatively small amount of contraction after being energized. When a lens assembly in the lens module requires a relatively large movement stroke, an SMA wire is required to be relatively long, in order that the amount of contraction of the SMA wire meets the movement stroke of the lens assembly. Therefore, a space occupied by an SMA actuating structure is relatively large; and multiple groups of SMA actuating structures are generally provided in current lens modules to realize lens focusing or anti-shake, which directly results in a relatively large volume of a block of the lens modules, which is disadvantageous to the miniaturization of the device.

SUMMARY

The present application aims to solve one of the technical problems existing in the conventional technology. To this end, a lens module and an electronic device are provided according to the present application. In the lens module according to the present application, an SMA actuating structure has a relatively large driving stroke and a relatively small volume.

A lens module according to an embodiment of a first aspect of the present application includes:
  a bearing portion for bearing a lens; and
  at least two groups of SMA actuating structures, and each group of the at least two groups of SMA actuating structures is connected to the same side portion or different side portions of the bearing portion, and each group of the at least two groups of SMA actuating structures includes:
    a driven member, which is fixedly provided on a side portion of the bearing portion;
    a first contact plate, which is provided at one side of the driven member;
    a first SMA wire, two ends of the first SMA wire are each electrically connected to the first contact plate, the first SMA wire is bent in a V shape, and a middle portion of the first SMA wire is in contact with the driven member;
    a second contact plate, which is provided at the other side of the driven member; and
    a second SMA wire, two ends of the second SMA wire are each electrically connected to the second contact plate, the second SMA wire is bent in a V shape, and a middle portion of the second SMA wire is in contact with the driven member, where
  the driven member is movably mounted between angles formed by the first SMA wire and the second SMA wire being bent.

The lens module according to the embodiment of the present application has at least the following advantageous effects.

Currents with different magnitudes are respectively applied to the first SMA wire and the second SMA wire, so that the driven member is tightly clamped between V-shaped angles of the two SMA wires through the first SMA wire and the second SMA wire, and the driven member is pulled to move in a direction of a line connecting the two V-shaped angles. When the SMA wire is contracted when being energized, since a distance between the contact plates remains unchanged, the V-shaped angle on the same SMA wire becomes larger, thereby pulling the driven member to move, and a movement stroke of the driven member is much greater than the length of contraction of the SMA wire, so as to achieve the effect of enlarging the movement stroke. The larger the V-shaped angle on the SMA wire is, the greater the distance that a V-shaped vertex on the SMA wire moves by is, when the SMA wire contracts in the same amount. In this case, a vertical distance between the first contact plate and the second contact plate located at two sides of the driven member can be set to be smaller, thereby reducing the thickness of the SMA actuating structure, which facilitates the miniaturization of the volume of the device.

In addition, at least two groups of SMA actuating structures are provided, and each group of the at least two groups of SMA actuating structures is connected to the same side portion or different side portions of the bearing portion. In a case that the SMA actuating structures are arranged at the same side portion of the bearing portion, different groups of SMA actuating structures act together to exert a pulling force on the bearing portion, so that the bearing portion drives the lens to focus; in a case that different groups of SMA actuating structures are arranged at different side portions of the bearing portion, each group of SMA actuating structures synchronously actuates and pulls the bearing portion to drive the lens to focus, or asynchronously actuates and pulls the bearing portion to drive the lens to perform focusing and anti-shake operations at the same time.

According to some embodiments of the present application, two groups of SMA actuating structures are provided, and the two groups of SMA actuating structures are connected to the same side or opposite sides of the bearing portion.

According to some embodiments of the present application, three groups of SMA actuating structures are provided, and the three groups of SMA actuating structures are arranged in a triangular shape along the bearing portion.

According to some embodiments of the present application, four groups of SMA actuating structures are provided, and the four groups of SMA actuating structures are arranged in a rectangular shape along the bearing portion.

According to some embodiments of the present application, a contact surface at which the driven member is contacted with the first SMA wire and/or the second SMA wire is an arc-shaped surface.

According to some embodiments of the present application, a limiting groove is provided at the contact surface at which the driven member is contacted with the first SMA wire and/or the second SMA wire, and the middle portion of the first SMA wire and/or the second SMA wire is located within the limiting groove.

According to some embodiments of the present application, the first contact plate and the second contact plate are each provided with a terminal, the first SMA wire is connected to the terminal of the first contact plate, the second SMA wire is connected to the terminal of the second contact plate; the terminal is inclined at a certain angle, and a direction in which the terminal is inclined is consistent with a direction in which the first SMA wire and/or the second SMA wire connected to the terminal is extended.

According to some embodiments of the present application, two first SMA wires and two second SMA wires are provided, and each of the two first SMA wires and each of the two second SMA wires are spaced by a certain gap.

An electronic device according to an embodiment of a second aspect of the present application includes the above lens module.

Additional aspects and advantages of the present application will be set forth, in part, from the following description, and in part will be apparent from the following description, or learned by practice of the present application.

BRIEF DESCRIPTION OF THE DRAWINGS

The above and/or additional aspects and advantages of the present application will become apparent and readily understood from the following description of embodiments in conjunction with the accompanying drawings, in which.

REFERENCE NUMERALS

SMA actuating structure 100;
driven member 110; limiting groove 111;
first contact plate 121; first SMA wire 122;
second contact plate 131; second SMA wire 132;
terminal 140;
bearing portion 200;
first SMA actuating structure 100a; second SMA actuating structure 100b;
third SMA actuating structure 100c; fourth SMA actuating structure 100d.

DETAILED DESCRIPTION OF THE EMBODIMENTS

The embodiments of the present application are described in detail hereinafter, and examples of the embodiments are shown in the accompanying drawings, where the same or similar reference numerals represent the same or similar elements or elements having the same or similar functions throughout the description. The embodiments described hereinafter with reference to the accompanying drawings are exemplary, and are only used to explain the present application, but should not be construed as a limitation on the present application.

In the description of the present application, it is to be appreciated that the orientation or positional relationship indicated by the terminology, such as up, down, left, right, front and rear, is based on the orientation or positional relationship shown in the drawings, which is only to facilitate the description of the present application and to simplify the description, rather than indicating or implying that the device or element referred to must have a specific orientation, be constructed and operated in a particular orientation, and therefore cannot be understood as a limitation on the present application.

In the description of this application, unless otherwise clearly defined, words such as setting, installation, connection should be understood in a broad sense, and those skilled in the art can reasonably determine specific meanings of the above words in the present application in combination with specific content of the technical solution.

The lens module according to an embodiment of a first aspect of the present application will be described hereafter according to FIGS. 1 to 8.

Reference is made to FIG. 1, and FIGS. 3 to 6, and the lens module according to the present application includes:
a bearing portion 200, configured to bear a lens; and
at least two groups of SMA actuating structures 100, and each group of the at least two groups of SMA actuating structures 100 is connected to a same side portion or different side portions of the bearing portion 200, and includes:
  a driven member 110, which is fixedly provided on a side portion of the bearing portion 200;
  a first contact plate 121, which is provided at one side of the driven member 110;
  a first SMA wire 122, two ends of the first SMA wire 122 are each electrically connected to the first contact plate 121, the first SMA wire 122 is bent in a V shape, and a middle portion of the first SMA wire 122 is in contact with the driven member 110;
  a second contact plate 131, which is provided at the other side of the driven member 110;
  a second SMA wire 132, two ends of the second SMA wire 132 are each electrically connected to the second contact plate 131, the second SMA wire 132 is bent in a V shape, and a middle portion of the second SMA wire 132 is in contact with the driven member 110, where the driven member 110 is movably mounted between angles formed by the first SMA wire 122 and the second SMA wire 132 being bent.

It can be understood that the first contact plate 121 and the second contact plate 131 are fixedly provided; the driven member 110 is provided on one side of the bearing portion 200 and is fixedly connected to the bearing portion 200, the connection of the driven member 110 can be in the form of snap connection, welding connection or the like, and is not limited thereto.

Figure 1:
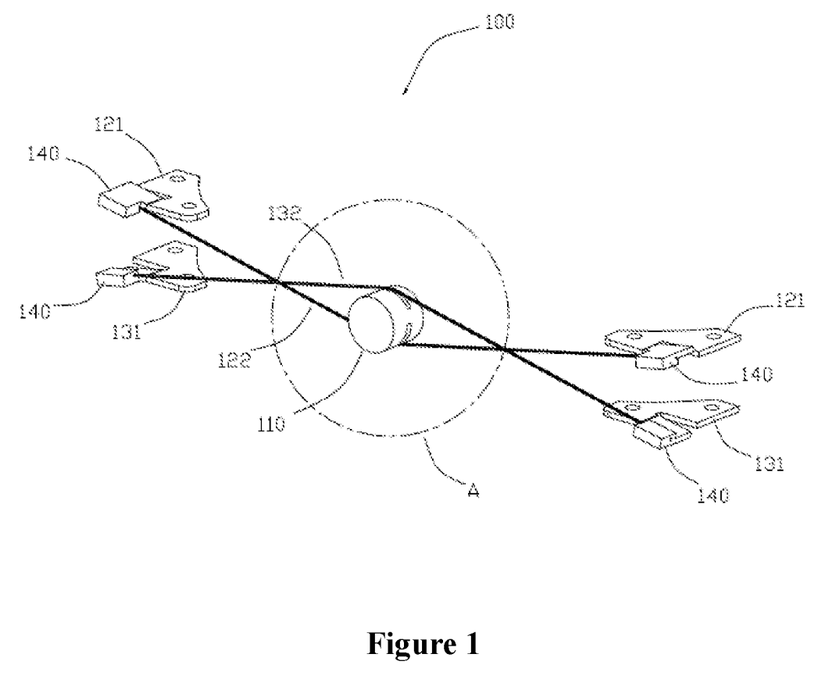
FIG. 1 is a perspective view illustrating an SMA actuating structure according to an embodiment of the present application.

It can be understood that currents with different magnitudes are respectively applied to the first SMA wire 122 and the second SMA wire 132, so that the driven member 110 is tightly clamped between V-shaped angles of the two SMA wires through the first SMA wire 122 and the second SMA wire 132, and the driven member 110 is pulled to move in a direction of a line connecting the two V-shaped angles. When the SMA wire is energized and then contracted, since a distance between the contact plates remains unchanged, the V-shaped angle on the same SMA wire becomes larger, thereby pulling the driven member 110 to move.

Specifically, a relatively large current is applied to the first SMA wire 122 to cause a contraction to a greater extent, and the first SMA wire 122 pulls the driven member 110 to move in the direction of the line connecting the two V-shaped angles, the driven member 110 drives the bearing portion 200 to move, so as to realize the focusing operation. In addition, a relatively small current is applied to the second SMA wire 132 to make the second SMA wire 132 be in a tensioning state, so that an acting force of which a direction is opposite to the moving direction, is applied to the driven member 110 during the movement of the driven member 110, which can prevent the bearing portion 200 from being deflected in a case that a driving force is applied to only one side of the bearing portion 200, which affects accuracy of the focusing. When the focusing is completed and it is required to be reset, a relatively large current is applied to the second SMA wire 132 and a relatively small current is applied to the first SMA wire 122, and the specific movement process is not repeated here.

A movement stroke of the driven member 110 is much greater than the length of contraction of the SMA wire, so as to achieve the effect of enlarging the movement stroke. When the V-shaped angle on the SMA wire is larger, and the SMA wire contracts in the same amount, the distance that a V-shaped vertex on the SMA wire moves by is greater. In this case, a vertical distance between the first contact plate 121 and the second contact plate 131 located at two sides of the driven member 110 can be set to be smaller, thereby reducing the thickness of the SMA actuating structure 100, which facilitates the miniaturization of the volume of the device.

Moreover, at least two groups of SMA actuating structures 110 are provided, and each group of the at least two groups of SMA actuating structures 100 is connected to the same side portion or different side portions of the bearing portion 200. In a case that the SMA actuating structures 100 are arranged at the same side portion of the bearing portion 200, different groups of SMA actuating structures 100 act together to exert a pulling force on the bearing portion 200, so that the bearing portion 200 drives the lens to focus; in a case that different groups of SMA actuating structures 100 are arranged at different side portions of the bearing portion 200, each group of SMA actuating structures 100 synchronously actuates and pulls the bearing portion 200 to drive the lens to focus, or asynchronously actuates and pulls the bearing portion 200 to drive the lens to simultaneously perform focusing and anti-shake operations. With this arrangement, the number of the SMA actuating structure 100 can be timely adjusted based on the structure of the bearing portion 200, which facilitates the miniaturization of the volume of the lens module.

Figure 4:
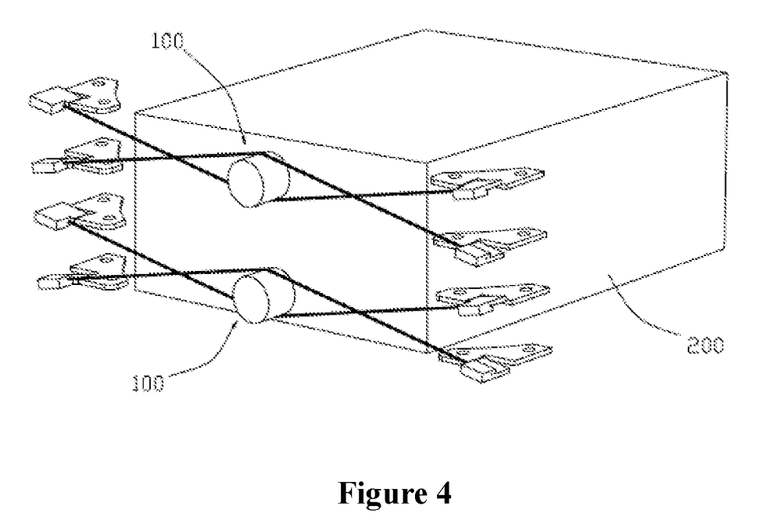
FIG. 4 is a perspective view illustrating a case in which two groups of SMA actuating structures are provided on a bearing portion according to another embodiment of the present application.

Reference is made to FIG. 4, and in some embodiments of the present application, two groups of SMA actuating structures 100 are provided, and the two groups of SMA actuating structures 100 are connected to the same side of the bearing portion 200.

Reference is made to FIG. 4, and it can be understood that, in a case that the SMA actuating structure 100 is applied in some lens modules with a large thickness, volume and mass, and the SMA actuating structure 100 mainly functions to drive the bearing portion 200 to perform a function of focusing operation, two SMA actuating structures 100 can be provided. Specifically, the two SMA actuating structures 100 are arranged at the same side of the bearing portion 200 and are arranged side by side in a thickness direction of the bearing portion 200. With this arrangement, the two groups of SMA actuating structures 100 are arranged at the same side of the bearing portion 200, which enables to save the installation space of the SMA actuating structure 100, and effectively save the volume of the lens module with the focusing function being realized.

Figure 3:
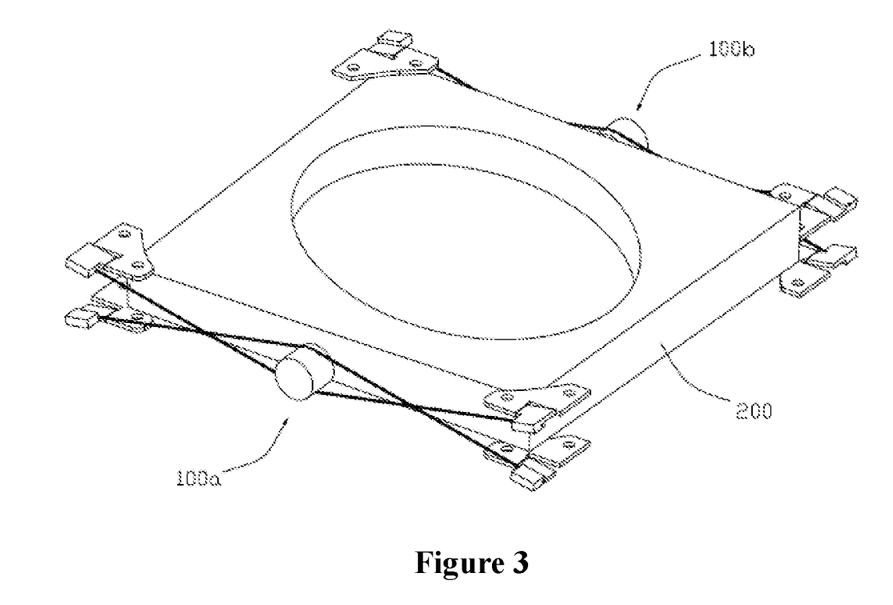
FIG. 3 is a perspective view illustrating a case in which two groups of SMA actuating structures are provided on a bearing portion according to an embodiment of the present application.

Reference is made to FIG. 3, and in some embodiments of the present application, two groups of SMA actuating structures 100 are provided, and the two groups of SMA actuating structures 100 are connected to opposite sides of the bearing portion 200.

Reference is made to FIG. 3, and it can be understood that in a case that the bearing portion 200 is rectangular-shaped, two groups of SMA actuating structures 100, which include a first SMA actuating structure 100a and a second SMA actuating structure 100b, are provided. Specifically, the driven members 110 of the two groups of SMA actuating structures are correspondingly arranged on opposite sides of the bearing portion 200, and the first contact plate 121 and the second contact plate 131 of the two groups of SMA actuating structures are also fixedly arranged. When the bearing portion 200 is required to drive the lens to perform the focusing operation, a relatively large current is applied to the first SMA wire 122 in each of the first SMA actuating structure 100a and the second SMA actuating structure 100b, and simultaneously a relatively small current is applied to the second SMA wire 132 in each of the first SMA actuating structure 100a and the second SMA actuating structure 100b, so that the driven member 110 in each of the first SMA actuating structure 100a and the second SMA actuating structure 100b simultaneously drives the bearing portion 200 to move along an optical axis, thereby realizing the focusing operation. When the bearing portion 200 is required to drive the lens to perform an optical anti-shake operation, a relatively large current is applied to the first SMA wire 122 in the first SMA actuating structure 100a, a relatively small current is applied to the second SMA wire 132, and at the same time, a relatively large current is applied to the second SMA wire 132 in the second SMA actuating structure 100b, and a relatively small current is applied to the first SMA wire 122, so that the driven member 110 of the first SMA actuating structure 100a and the driven member 110 of the second SMA actuating structure 100b move in opposite directions, thereby driving the bearing portion 200 to deflect, so as to realize an optical anti-shake motion.

Figure 5:
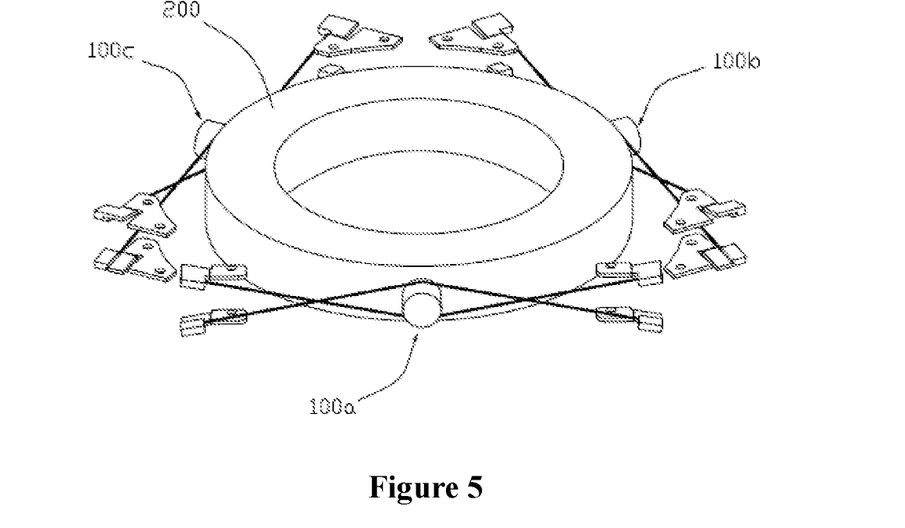
FIG. 5 is a perspective view illustrating a case in which three groups of SMA actuating structures are provided on a bearing portion according to an embodiment of the application.

Reference is made to FIG. 5, and in some embodiments of the present application, three groups of SMA actuating structures 100 are provided, and the three groups of SMA actuating structures 100 are arranged in a triangular shape along the bearing portion 200.

Reference is made to FIG. 5, and it can be understood that three groups of SMA actuating structures 100, which include a first SMA actuating structure 100a, a second SMA actuating structure 100b and a third SMA actuating structure 100c, may alternatively be provided. Specifically, When the bearing portion 200 is required to drive the lens to perform the focusing operation, a relatively large current is applied to the first SMA wire 122 in each of the three groups of SMA actuating structures and simultaneously a relatively small current is applied to the second SMA wire 132 in each of the three groups of SMA actuating structures, so that the driven member 110 in a fourth group of SMA actuating structures simultaneously drives the bearing portion 200 to move along an optical axis, so as to realize the focusing operation. When the bearing portion 200 is required to drive the lens to deflect to one side to perform an optical anti-shake operation, a relatively large current may be applied to the second SMA wire 132 in the first SMA actuating structure 100a, a relatively small current may be applied to the first SMA wire 122 in the first SMA actuating structure 100a, a relatively large current may be applied to the first SMA wire 122 in each of the second SMA actuating structure 100b and the third SMA actuating structure 100c, and a relatively small current may be applied to the second SMA wire 132 in each of the second SMA actuating structure 100b and the third SMA actuating structure 100c, so that the driven member 110 in the first SMA actuating structure 100a drives the bearing portion 200 to be lowered, and the driven member 110 in each of the second SMA actuating structure 100b and the third SMA actuating structure 100c drives the bearing portion 200 to be lifted, thereby realizing an optical anti-shake motion.

Figure 6:
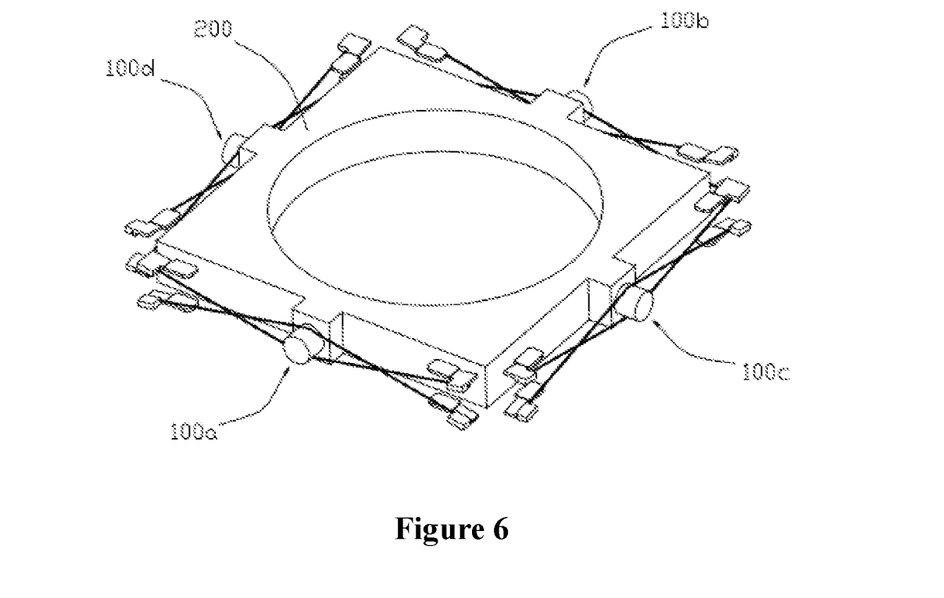
FIG. 6 is a perspective view illustrating a case in which four groups of SMA actuating structures are provided on a bearing portion according to an embodiment of the present application.

Reference is made to FIG. 6, and in some embodiments of the present application, four groups of SMA actuating structures 100 are provided, and the four groups of SMA actuating structures 100 are arranged in a rectangular shape along the bearing portion 200.

Reference is made to FIG. 6, and it can be understood that in a case that the bearing portion 200 is rectangular-shaped, four groups of SMA actuating structures 100, which include a first SMA actuating structure 100a, a second SMA actuating structure 100b, and a third SMA actuating structure 100c, and a fourth SMA actuating structure 100d, may alternatively be provided. Specifically, the driven members 110 of the four groups of SMA actuating structures are respectively arranged on four side surfaces of the bearing portion 200. When the bearing portion 200 is required to drive the lens to perform the focusing operation, a relatively large current is applied to the first SMA wire 122 in each of the four groups of SMA actuating structures, and simultaneously a relatively small current is applied to the second SMA wire 132 in each of the four groups of SMA actuating structures, so that the driven members 110 in the four groups of SMA actuating structures 100 simultaneously drive the bearing portion 200 to move along an optical axis, thereby realizing the focusing operation.

When the bearing portion 200 is required to drive the lens to perform an optical anti-shake operation, taking a deflection in a direction of the X-axis or the Y-axis as an example, a relatively large current may be applied to the first SMA wire 122 in the first SMA actuating structure 100a, a relatively small current may be applied to the second SMA wire 132 in the first SMA actuating structure 100a, a relatively large current may be applied to the second SMA wire 132 in the second SMA actuating structure 100b, and a relatively current may be applied to the first SMA wire 122 in the second SMA actuating structure 100b, so that the driven member 110 of the first SMA actuating structure 100a and the driven member 110 of the second SMA actuating structure 100b move in opposite directions, thereby driving the bearing portion 200 to deflect, so as to realize an optical anti-shake motion. In addition, a small current is applied to each SMA wire in the third SMA actuating structure 100c and the fourth SMA actuating structure 100d to maintain a tensioning state thereof, which can further enhance the stability of the bearing portion 200 when it is deflected.

When the bearing portion 200 is required to drive the lens to deflect diagonally towards the bearing portion 200 to realize the optical anti-shake operation, a relatively large current may be applied to the first SMA wires 122 in each of the first SMA actuating structure 100a and the fourth SMA actuating structure 100d, a relatively small current may be applied to the second SMA wire 132 in each of the first SMA actuating structure 100a and the fourth SMA actuating structure 100d, so that the driven member 110 in each of the first SMA actuating structure 100a and the fourth SMA actuating structure 100d drives the bearing portion 200 to be lifted, and at the same time, a relatively large current may be applied to the second SMA wire 132 in each of the second SMA actuating structure 100b and the third SMA actuating structure 100c, and a relatively small current may be applied to the first SMA wire 122 in each of the second SMA actuating structure 100b and the third SMA actuating structure 100c, so that the driven member 110 in each of the second SMA actuating structure 100b and the third SMA actuating structure 100c drives the bearing portion 200 to be lowered.

Figure 7:
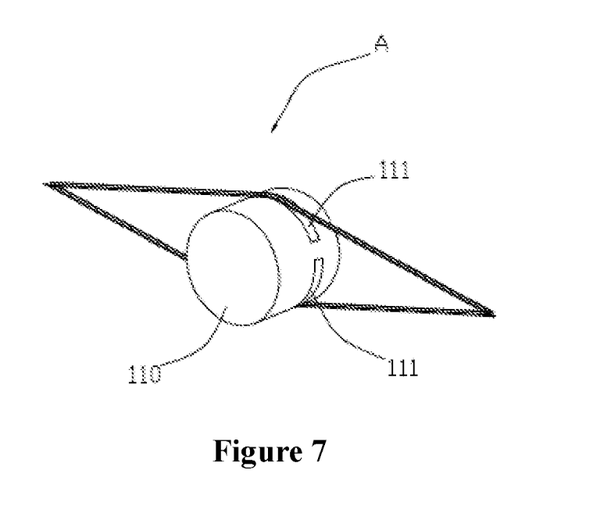
FIG. 7 is an enlarged view of a portion A in FIG. 1.
Figure 8:
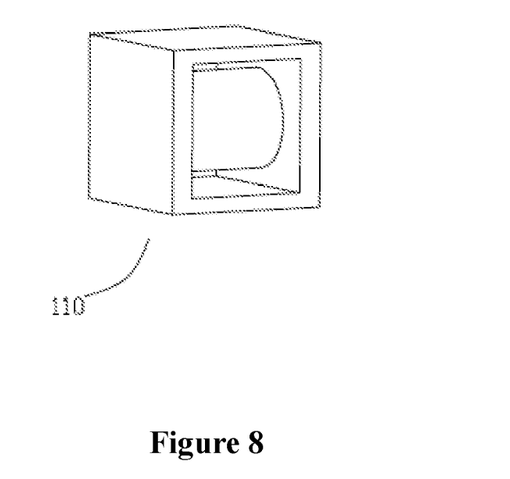
FIG. 8 is a perspective view illustrating a driven member according to an embodiment of the application.

Reference is made to FIGS. 1, 7 and 8, and in some embodiments of the present application, a contact surface at which the driven member 110 is contacted with the first SMA wire 122 and/or the second SMA wire 132 is an arc-shaped surface.

For example, as shown in FIGS. 1 and 7, and it can be understood that the driven member 110 is of a cylinder. The contact surface at which the driven member 110 is contacted with the first SMA wire 122 and the second SMA wire 132 is an arc-shaped surface. Since the driven member 110 is movably mounted between angles formed by the first SMA wire 122 and the second SMA wire 132 being bent, when the first SMA wire 122 and the second SMA wire 132 are contracted and tensioned by being energized, the arc-shaped surface of the driven member 110 enables the driven member 110 to freely slide between V-shaped angles formed by the first SMA wire 122 and the second SMA wire 132, to complete centering correction, so that the driven member 110 is in a balanced state when the SMA wire is energized, and thus it is enabled to prevent the driven member 110 from being asymmetrical with respect to the SMA wires, which facilitates reducing the risk of abnormal deflection of the driven member 110.

It can be understood that alternatively, the driven member 110 may be in other design forms in addition to the cylinder, for example, as shown in FIG. 8, circular arc-shaped channels are provided inside of the driven member 110, and the first SMA wire 122 and the second SMA wire 132 are respectively provided in the circular arc-shaped channels by passing through the circular arc-shaped channels. With this arrangement, the SMA wire can be prevented from being detached from the driven member 110 during movement or when being impacted by an abnormal external force, thereby affecting the movement of the driven member 110, which facilitates to improve the reliability of the SMA actuating structure 100.

Reference is made to FIGS. 1 and 7, and in some embodiments of the present application, a limiting groove 111 is provided at the contact surface at which the driven member 110 is contacted with the first SMA wire 122 and/or the second SMA wire 132, and the middle portion of the first SMA wire 122 and/or the second SMA wire 132 is located within the limiting groove 111.

It can be understood that, in order to enable the driven member 110 to be more stable between the first SMA wire 122 and the second SMA wire 132, the limiting groove 111 is provided at the arc-shaped contact surface of the driven member 110. Specifically, the limiting groove 111 has a width and a depth, both of which are larger than a diameter of the SMA wire, so that the SMA wire is movable freely in the limiting groove 111, which prevents a gap between a side wall of the limiting groove 111 and the SMA wire from being too small to affect the contraction of the SMA wire, which facilitates the heat dissipation of the SMA wire in the limiting groove 111. In addition, the limiting groove 111 has a length greater than a length of a part, that is contacted with the driven member 110, of the SMA wire. When the first SMA wire 122 and the second SMA wire 132 contract when being energized to jointly drive the driven member 110 to move, when the driven member 110 slides between the V-shaped angles formed by the first SMA wire 122 and the second SMA wire 132 to complete the centering correction, due to the length of the limiting groove 111 being greater than the length of the part, that is contacted with the driven member 110, of the SMA wire, the first SMA wire 122 and the second SMA wire 132 can always be located within the limiting groove 111 during the sliding of the driven member 110, which can prevent the first SMA wire 122 and the second SMA wire 132 from deviating from a predetermined position, thereby affecting the movement accuracy. Two limiting grooves 111 are provided and are respectively configured for allow the first SMA wire 122 and the second SMA wire 132 to be provided therein by passing through the two limiting grooves 111, and the limiting grooves 111 corresponding to the first SMA wire 122 and the second SMA wire 132 are provided separately, which can prevent the first SMA wire 122 and the second SMA wire 132 from being in contact with each other in certain operating conditions, resulting in a short circuit between the SMA wires or affecting heat dissipation.

It can be understood that, in order to insulate the first SMA wire 122 and the second SMA wire 132 from each other, so as to ensure that the driven member 110 can accurately and smoothly move in different directions, insulation measures, such as coating an insulating layer on the surfaces of the first SMA wire 122 and the second SMA wire 132, are taken between the first SMA wire 122 and the second SMA wire 132. In addition, the driven member 110 can alternatively be processed to be insulted, for example, an insulating layer is coated on the surface of the driven member 110 or the driven member 110 is made of an insulating material, such as plastic material.

Figure 2:
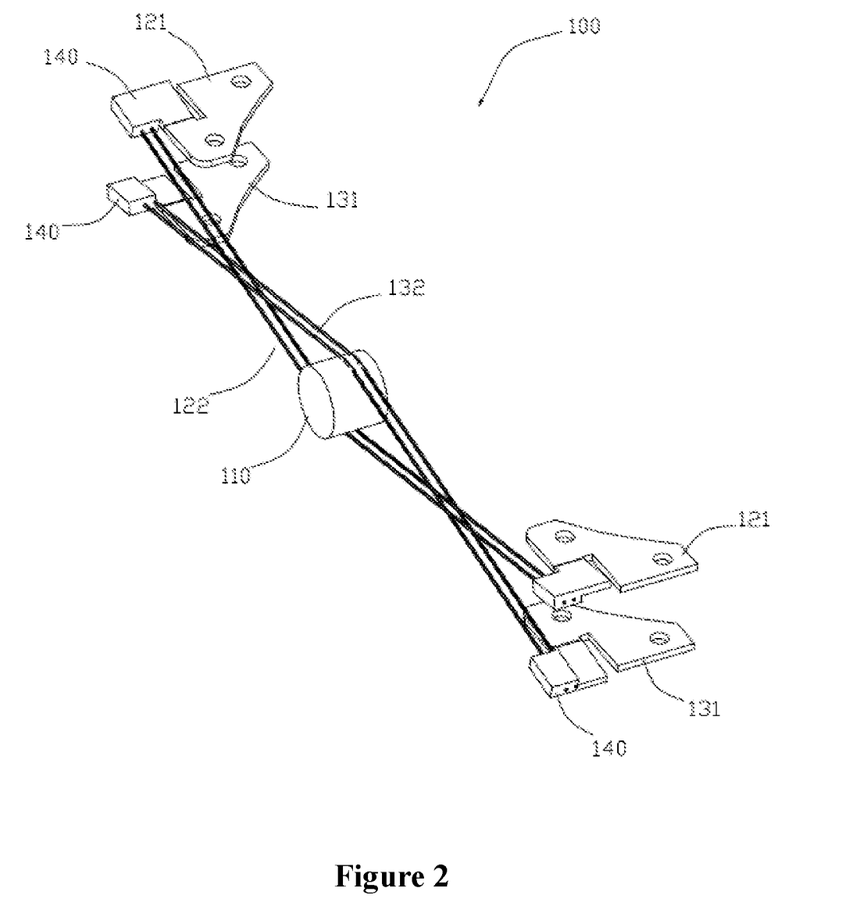
FIG. 2 is a perspective view illustrating a case in which an SMA actuating structure is provided with two first SMA wires and two second SMA wires according to an embodiment of the present application.

Reference is made to FIGS. 1 and 2, and in some embodiments of the present application, the first contact plate 121 and the second contact plate 131 are each provided with a terminal 140, the first SMA wire 122 is connected to the terminal 140 of the first contact plate 121, the second SMA wire 132 is connected to the terminal 140 of the second contact plate 131; the terminal 140 is inclined at a certain angle, and a direction in which the terminal 140 is inclined is consistent with a direction in which the first SMA wire 122 and/or the second SMA wire 132 connected to the terminal 140 is extended.

It can be understood that, since both the first SMA wire 122 and the second SMA wire 132 are bent in a V shape, both ends of the first SMA wire 122 are connected to the first contact plate 121, and both ends of the second SMA wire 132 are connected to the second contact plate 131. Specifically, in the actual assembly process, an end of the SMA wire that is connected to the contact plate is generally connected by welding, or is bonded to a surface of the contact plate. When the SMA wire is bent into a V shape, creases are to be formed at the position at which the SMA wire and the contact plate are connected. After a long time or being contracted for a certain number of times when being energized, the SMA wire cracks at the creases, thus affecting the service life of the SMA wire. Therefore, the terminal 140 inclined at a certain angle is provided on the first contact plate 121 and the second contact plate 131, and the inclination angle thereof is directed toward the length direction of the first SMA wire 122 and/or the second SMA wire 132 connected to the terminal 140. The SMA wire is welded or bonded to the terminal 140 on the contact plate. In an initial state, the angle between a section, which is fixedly connected to the terminal 140, of the SMA wire and an adjacent side of the V-shaped angle is 0. When the SMA wire contracts by being energized, the value of the angle between the section, which is fixedly connected to the terminal 140, of the SMA wire and the adjacent side of the V-shaped angle only changes slightly. With this arrangement, the bending angle of the SMA wire at a position at which the SMA wire and the contact plate is connected can be reduced, the wear of the SMA wire can be reduced, the service life of the SMA wire can be improved, which facilitates improving the reliability of the SMA actuating structure 100.

Reference is made to FIG. 2, and in some embodiments of the present application, two first SMA wires 122 and two second SMA wires 132 are provided, and each of the two first SMA wires 122 and each of the two second SMA wires 132 are spaced by a certain gap.

It can be understood that the two first SMA wires 122 are arranged side by side and both are connected to the first contact plate 121, the two second SMA wires 132 are arranged side by side and both are connected to the second contact plate 131, and the driving member 110 is clamped between the V-shaped angle formed by the two first SMA wires 122 and the two second SMA wires 132. With this arrangement, a driving force of the SMA actuating structure 100 can be increased without increasing the volume of the SMA actuating structure 100, so as to achieve the purpose of saving space. Specifically, the two first SMA wires 122 are controlled synchronously, and the two second SMA wires 132 are controlled synchronously. This arrangement also simplifies control steps and facilitates the layout of the first contact plate 121 and the second contact plate 131.

It can be understood that, multiple first SMA wires 122 and multiple second SMA wires 132 may be provided, the number thereof is not limited to two, and may be provided according to the circuit arrangement and heat dissipation conditions.

It can be understood that a certain amount of heat is generated when the SMA wire is contracted by being energized. In order to enable the SMA wire to meet the requirements of the heat dissipation, the SMA wire is required to be arranged apart from each other by a certain distance. Specifically, Reference is made to FIG. 2, the two first SMA wires 122 are staggered and arranged apart from each other by a certain gap, where one second SMA wire 132 is provided in the gap between the two first SMA wires 122 by passing through the gap, and the other second SMA wire 132 is provided at a side of one of the first SMA wires 122 and away from the gap between the two first SMA wires 122. With this arrangement, a corresponding position between the first SMA wire 122 and the second SMA wire 132 is enabled to not be deviated in a great degree, when the first SMA wire 122 or the second SMA wire 132 pulls the driven member 110 to move, the second SMA wire 132 or the first SMA wire 122 which does not acts to drive can better firmly clamp the driven member 110 between the V-shaped angles formed by the first SMA wire 122 and the second SMA wire 132.

It will be understood that the two first SMA wires 122 and the two second SMA wires 132 may be in other arrangement. For example, the two first SMA wires 122 are arranged side by side apart from each other by a certain gap, the two second SMA wires 132 are arranged side by side apart from each other by a certain gap, and the two first SMA wires 122 are provided in the gap between the two second SMA wires 132 by passing through the gap. With this arrangement, the driven member 110 can also be firmly clamped between the V-shaped angles formed by the first SMA wire 122 and the second SMA wire 132 during the movement.

An electronic device according to an embodiment of a second aspect of the present application includes the above lens module.

It can be understood that, with this arrangement, the SMA actuating structure 100 has a small thickness, which facilitates reducing the volume of the lens module, which in turn facilitates the miniaturization of the volume of the device, or more lens modules can be provided in a certain space, to improve imaging capabilities of the electronic device.

The embodiments of the present application have been described in detail above in conjunction with the drawings. However, the present application is not limited to the above embodiments, and various modifications can be made without departing from the purpose of the present application within the scope of knowledge possessed by those of ordinary skill in the art.

What is claimed is:

1. A lens module, comprising:
  a bearing portion having four side portions connected to form a frame for bearing a lens; and
  at least two groups of SMA actuating structures,
  wherein each side portion having a surface facing outwardly from the bearing portion so that the bearing portion having a first pair of surfaces and a second pair of surfaces, the first pair of surfaces having a first surface and a second surface in parallel to each other and the second pair of surfaces having a third surface and a fourth surface in parallel to each other,
  wherein each group of the at least two groups of SMA actuating structures is disposed across the first surface or respectively disposed across the first surface and the second surface,
  each group of the at least two groups of SMA actuating structures comprises:
    a driven member fixedly provided on a center of the corresponding surface;
    a first pair of contact plates affixed to the first surface;
    a first SMA wire, wherein two ends of the first SMA wire are each electrically connected to each of the first pair of contact plates, respectively, and a middle portion of the first SMA wire is in contact with the driven member and forms a first bend;
    a second pair of contact plates affixed to the first surface; and
    a second SMA wire, wherein two ends of the second SMA wire are each electrically connected to each of the second pair of contact plates, respectively, and a middle portion of the second SMA wire is in contact with the driven member and forms a second bend, and
  wherein the driven member is movably mounted between the first bend in the first SMA wire and the second bend in the second SMA wire being bent.

2. The lens module according to claim 1, wherein two groups of SMA actuating structures are provided.

3. The lens module according to claim 1, wherein four groups of SMA actuating structures are provided, and are respectively disposed across the first surface, the second surface, the third surface, and the four surface.

4. The lens module according to claim 1, wherein a contact surface at which the driven member is contacted with the first SMA wire and/or the second SMA wire is an arc-shaped surface.

5. The lens module according to claim 4, wherein a limiting groove is provided at the contact surface at which the driven member is contacted with the first SMA wire and/or the second SMA wire, and the middle portion of the first SMA wire and/or the second SMA wire is located within the limiting groove.

6. The lens module according to claim 1, wherein each contact plate in the first pair of contact plates and the second pair of contact plate is with a terminal, the first SMA wire is connected to two terminals in the first pair of contact plates, the second SMA wire is connected to two terminals in the second contact plate; each terminal is inclined at a certain angle in a direction in which the first SMA wire and/or the second SMA wire connected to the terminal is extended.

7. The lens module according to claim 1, wherein two first SMA wires and two second SMA wires are provided, and each of the two first SMA wires and each of the two second SMA wires are spaced by a certain gap.

8. An electronic device, comprising the lens module according to claim 1.

9. An electronic device, comprising the lens module according to claim 2.

10. An electronic device, comprising the lens module according to claim 3.

11. An electronic device, comprising the lens module according to claim 5.

12. An electronic device, comprising the lens module according to claim 6.

13. An electronic device, comprising the lens module according to claim 6.

14. An electronic device, comprising the lens module according to claim 7.

* * * * *